United States Patent [19]
Parke et al.

[11] Patent Number: 5,349,383
[45] Date of Patent: Sep. 20, 1994

[54] TWO LAYER VIDEO SIGNAL CODING

[75] Inventors: Ian Parke; Michael E. Nilsson; David O. Beaumont; David G. Morrison, all of Suffolk, England

[73] Assignee: British Telecommunications public limited company, London, England

[21] Appl. No.: 39,489
[22] PCT Filed: Oct. 15, 1991
[86] PCT No.: PCT/GB91/01788
  § 371 Date: Apr. 30, 1993
  § 102(e) Date: Apr. 30, 1993
[87] PCT Pub. No.: WO92/07445
  PCT Pub. Date: Apr. 30, 1992

[30] Foreign Application Priority Data

Oct. 15, 1990 [GB] United Kingdom ............ 9022326

[51] Int. Cl.$^5$ ............................ H04N 7/137
[52] U.S. Cl. .................... 348/397; 348/401; 348/405; 348/419
[58] Field of Search ........... 348/419, 405, 397, 415, 348/409, 404, 403, 402, 401, 400, 390, 384; H04N 7/13, 7/133, 7/137

[56] References Cited

U.S. PATENT DOCUMENTS

| | | | |
|---|---|---|---|
| 4,541,012 | 9/1985 | Tescher | 348/400 |
| 4,958,226 | 9/1990 | Haskell et al. | 348/416 |
| 4,984,076 | 1/1991 | Watanabe et al. | 348/405 |
| 5,159,447 | 10/1992 | Haskell et al. | 348/419 |
| 5,196,933 | 3/1993 | Henot | 348/419 |
| 5,253,058 | 10/1993 | Gharavi | 348/409 |

FOREIGN PATENT DOCUMENTS

0321318A1 6/1989 European Pat. Off.
WO87/05179 8/1987 World Int. Prop. O.

OTHER PUBLICATIONS

IEEE Journal on Selected Areas in Communications, vol. 7, No. 5, Jun. 1989, IEEE, M. Ghanbari: "Two-Layer Coding of Video Signals for VBR Networks", pp. 771-781.
IEEE Trans on Communications, vol. 37, No. 4, Apr. 1989, NG Shoau-Bau et al.: "Two-Tier DPCM Codec for Video Conferencing", pp. 380-386.

*Primary Examiner*—Tommy P. Chin
*Assistant Examiner*—Bryan S. Tung
*Attorney, Agent, or Firm*—Nixon & Vanderhye

[57] ABSTRACT

A method of coding a video signal for transmission includes the steps of coding data representing the video signal by a base layer coding operation which includes base layer quantizer having a base layer quantization step size to provide coded video data for transmission; deriving inverse-coded video data by carrying out an inverse base layer coding operation on the coded video data; deriving difference data from the data representing the video signal and the inverse coded video data; and coding the difference data by an enhancement layer coding operation only when the energy of the difference data exceeds a variable threshold, the threshold being inversely proportional to the base layer quantization step size.

7 Claims, 3 Drawing Sheets

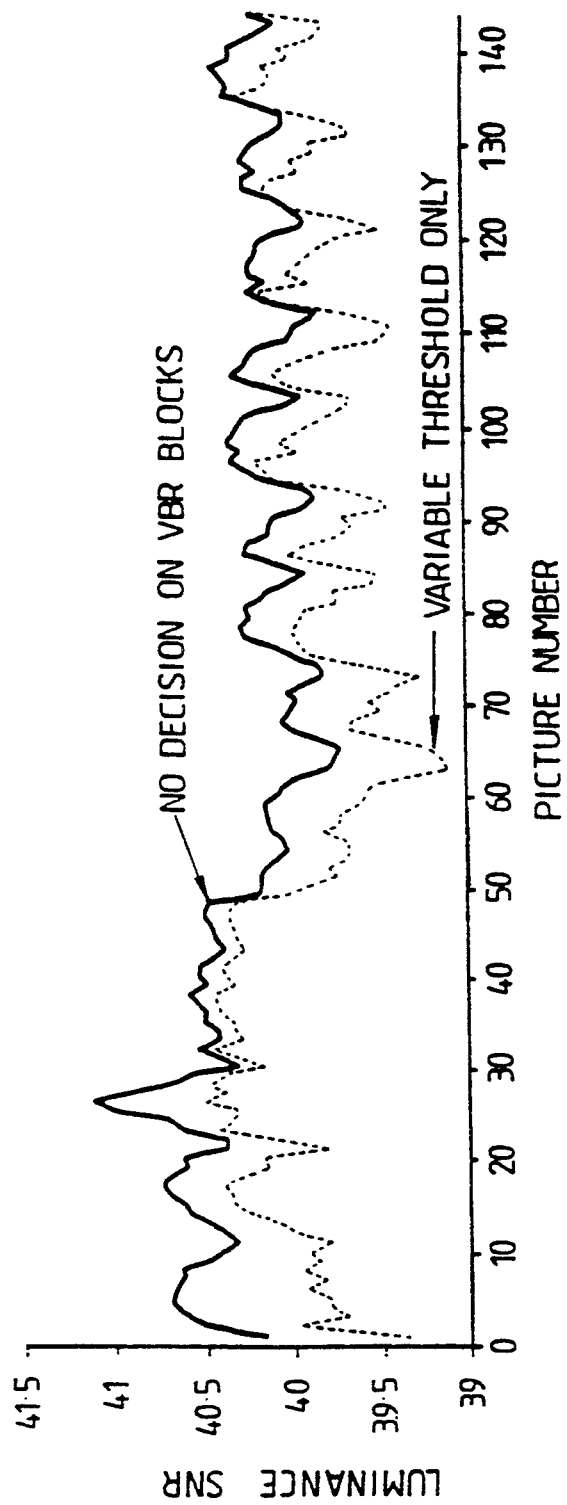

TWO LAYER VIDEO SIGNAL CODING

The present invention relates to the coding of video signals.

Techniques are well known for coding digitised video signals to achieve data compression and thereby reduce the bit rate required to transmit the coded video signals. An example of such a technique is the CCITT recommendation H. 261 Video Coding Standard which employs spatial and temporal redundancies in a video coding process to achieve data compression. Such redundancies vary with picture content and hence the level of data compression and the resultant required bit rate also vary. To facilitate operation with fixed or constant bit rate transmission channels buffering of the coded video data takes place. However this buffering is insufficient to cope with large and rapid variations in data rate as experienced, for example, with a scene change or as a result of motion in the picture. In such circumstances parameters of the coding process are adjusted to reduce the coded data rate. There is, however, a resultant reduction in picture quality. One form of parameter control involves adjusting the step size of the quantisation stage of the coding process in relation to the fullness of the buffer. The overall result is that for fixed rate transmission channels the picture quality is variable, with coding distortions being particularly visible at some times where at other times channel capacity may be wasted because there are few changes to be transmitted.

The prospect of asynchronous transfer mode (ATM) networks such as broadband ISDN, CCITT recommendation I121, offers the possibility of variable bit rate transmission channels with potential benefits for the type of video coding just described. A first approach might be to dispense with the buffering of the coded video data and to exploit the variable bit rate channel of an ATM network to cope with the variable coded data rate of the video transmission. However, ATM networks, which will commonly be packet or cell based, are potentially liable to packet or cell loss, and highly predictive video coding techniques would not respond well to intermittent data loss. To overcome this problem and take advantage of the variable bit rate transmission channels, it has been proposed (N Ghanbrai, IEEE Journal of Selected Areas of Communication, vol 7, no 5, June 1989 pp771–781) to employ two layer video coding with a first, base layer coding containing essential video data and a second, enhancement layer coding containing the difference between input data and the result of the first layer coding, see FIG. 1. The coded data from the base layer coding can be sent via a constant bit rate (CBR) transmission channel with "guaranteed" packets and coded data from the enhancement layer can be transmitted over a variable bit rate (VBR) transmission channel. In the event that packets or cells are lost from the enhancement data on the VBR channel, a minimum picture quality will be maintained by the base layer data sent over the CBR channel. It is an object of the present invention to provide an improved method of coding video signals.

According to the present invention a method of coding a video signal for transmission, comprises:

coding data representing the video signal by a base layer coding operation which includes a base layer quantization step size to provide coded video data for transmission;

deriving inverse-coded video data by carrying out an inverse base layer coding operation on the coded video data;

deriving difference data from the data representing the video signal and the inverse coded video data; and coding the difference data by an enhancement layer coding operation;

characterised in that the difference data is coded only when the energy of the difference data exceeds a variable threshold, the threshold being inversely proportional to the base layer quantization step size.

According to a further aspect of the present invention apparatus for encoding a video signal for transmission, comprises:

means for coding data representing the video signal by a base layer coding operation which includes a base layer quantizer having a base layer quantization step size to provide coded video data for transmission;

means for deriving inverse-coded video data by carrying out an inverse base layer coding operation on the coded video data;

means for deriving difference data from the data representing the video signal and the inverse coded video data; and means for coding the difference data by an enhancement layer coding operation;

characterised in that the means for coding the difference data operates only when the energy of the difference data exceeds a variable threshold, the threshold being inversely proportional to the base layer quantization step size.

A preferred embodiment of the invention will now be described by way of example and with reference to the accompanying drawings, wherein:

FIG. 4 is a graph illustrating the reduced signal to noise ratio obtainable with the present invention.

Figure 1:
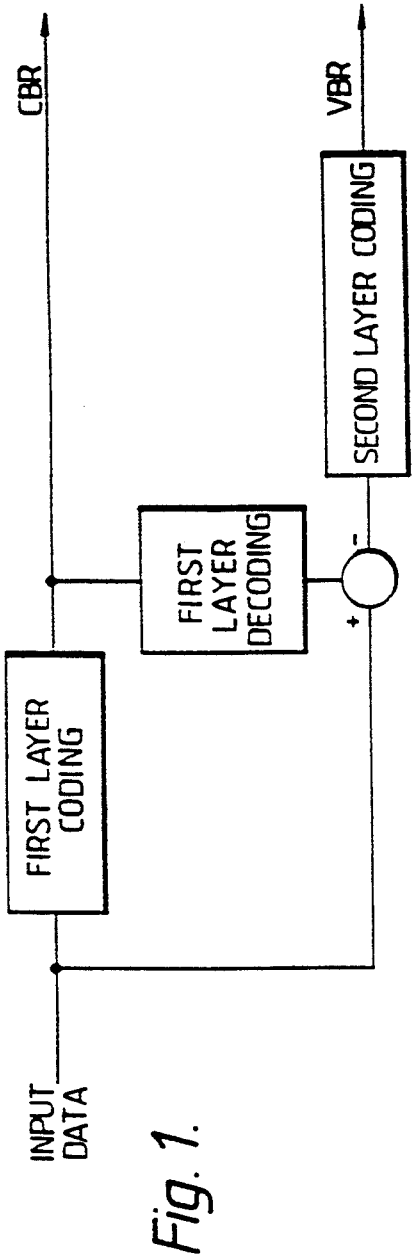
FIG. 1 is a schematic diagram of a two layer video coding process.
Figure 3:
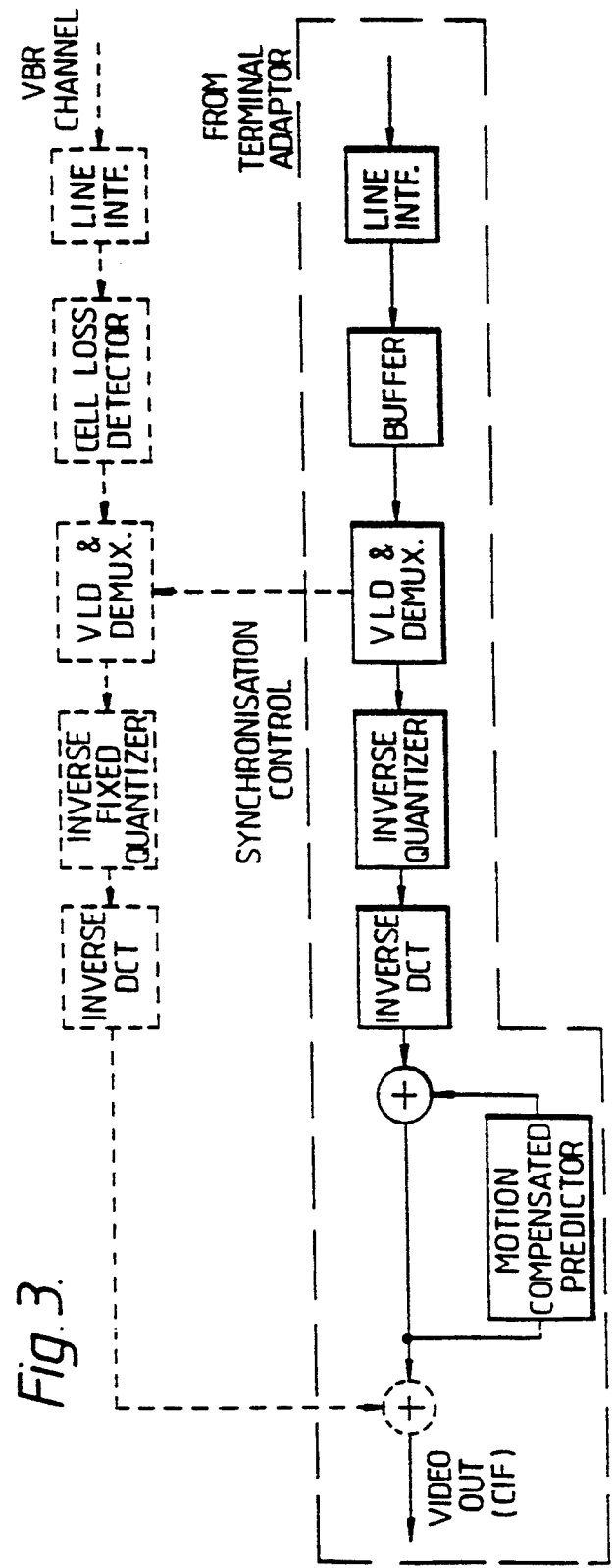
FIG. 3 is a schematic diagram of an H.261 video decoder modified in accordance with an embodiment of the invention.
Figure 2:
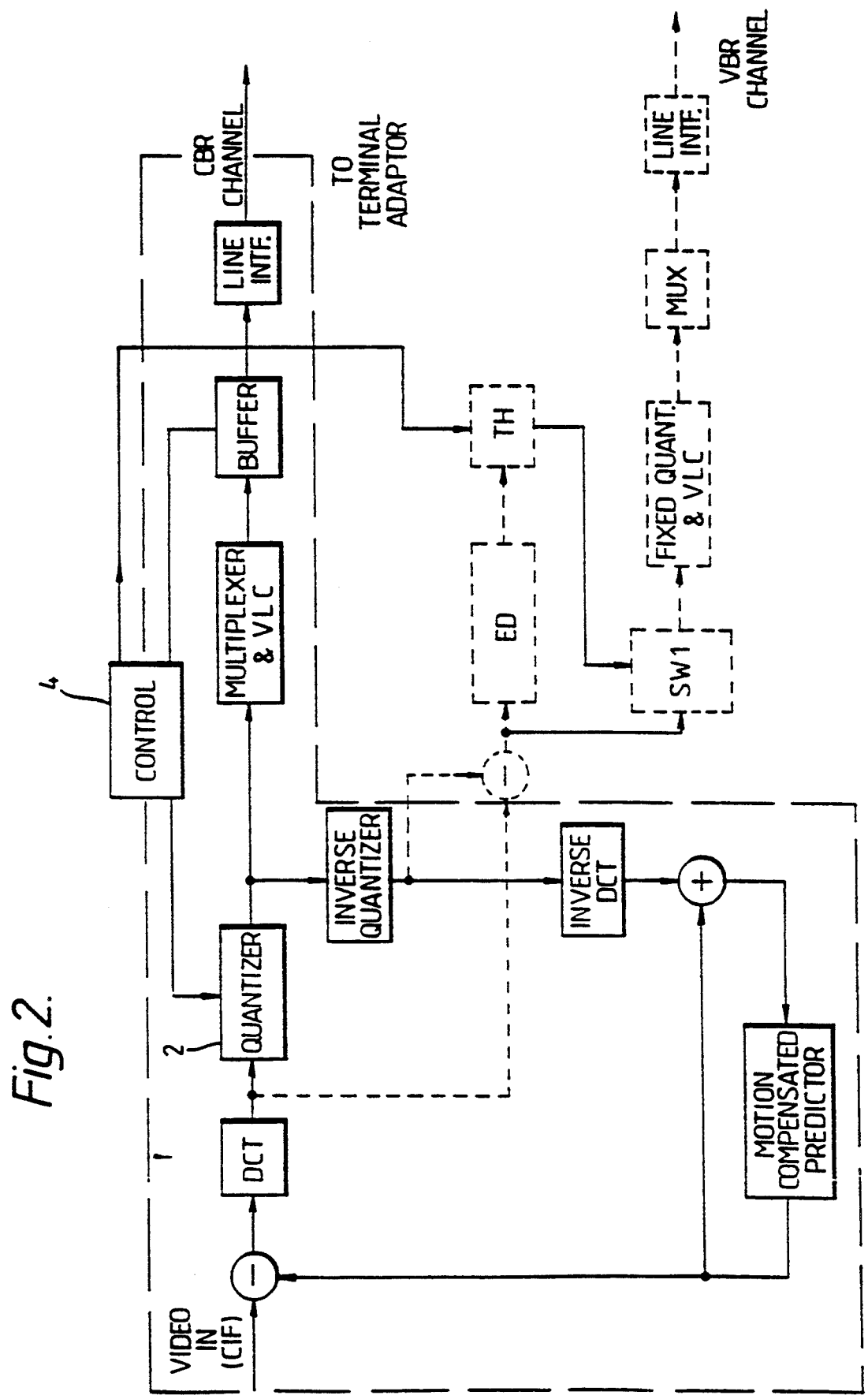
FIG. 2 is a schematic diagram of an H.261 video encoder modified in accordance with an embodiment of the invention.

Referring generally to FIGS. 2 and 3, an embodiment of the invention will be described as a modification to the CCITT H.261 coding process as exemplified by the video encoder and decoder of FIGS. 2 and 3, respectively, the invention is applicable to other coding schemes and the H.261 standard is chosen to illustrate the principles of the embodiments of the invention, and is not chosen by way of limitation. The parts of the embodiment of the invention illustrated in FIGS. 2 and 3 corresponding to the H. 261 standard are shown contained within broken line boxes. As these parts of the encoder and decoder are well known they will not be described in detail.

Referring first to FIG. 2 encoding of video input data takes place according to the H. 261 standard to provide a base layer of coded video data for transmission over a CBR channel. From the H. 261 coding process the coded data after DCT coding and prior to quantisation is extracted. In the H. 261 coding process the DCT coded data is quantised by quantiser 2 controlled by control 4 for transmission and this quantised data is also inverse quantised for use in subsequent coding steps. The extracted DCT coded data is substracted from the inverse quantised data to produce variable difference data. The variable difference data is processed for transmission over a variable bit rate transmission channel, as will now be described.

The variable difference data is selectively coupled by switch (SW1) to a fixed quantiser and variable length coder (Q&VLC) and hence via a multiplexer (Mux) and a line interface (LI) to a variable bit rate (VBR) data channel. The switch (SW1) is controlled by a threshold detector (TH) which receives inputs from the quantiser controller 4 of the H.261 coder and an energy determinator (ED) which operates on the variable difference data. In addition a control circuit (C) operates on the quantiser (Q) of the H.261 coder.

The encoding process of the preferred embodiment will now be described in more detail. The energy of the variable difference data is determined by the energy detector (ED) on a block (8 by 8 PEL) as the sum of the squares of the DCT coefficients of the variable difference data. The calculated block energy (BE) is compared with a threshold level (TL) by threshold detector (TH) which has its threshold set on the basis of the step size of the quantiser (Q) of the H.261 coder. The threshold level (TL) is set as $$TL = K \text{ (base quantiser step size)}$$

where K is a constant. If the block energy (BE) is greater than the threshold level (TL), then the switch (SW1) is operated so that the variable difference data for that block is processed and transmitted as follows.

Variable difference data received by quantiser and variable length coder (Q and VLC) is quantised at a fixed small step level and coded using a variable length coding, e.g. 2D-VLC coding. The quantised and coded variable difference data is passed via multiplexer (Mux), which adds addressing information, and line interface (LI) to a VBR channel, of for example an ATM network.

The process just described results in data for blocks of variable difference data having an energy greater than the threshold level being coded and transmitted over the VBR channel. Thus, blocks with significant changes in them are transmitted whereas blocks with smaller changes are not. FIG. 4 is a graph showing the comparison of SNR for blocks greater than the variable threshold in the second layer to no decision on blocks in the second layer. The mean bit rate for the second layer has dropped to 31315 bits/s a saving of 33% on the 2-layer model without any thresholding. The mean SNR has dropped to 39.93 dBs (a drop of 0.34 dBs.) The spread is 1.4 dBs.

Data for blocks with instantaneous energy levels below the threshold level will not be transmitted and thus small changes, for example in background detail, may not ever be transmitted as enhancement data. Such small changes may occur at a low rate and gradually an error may build between the "true" image and that encoded and transmitted.

To overcome this problem the step size of the quantiser (Q) of the H. 261 encoder is fixed to the same step size as the quantiser in the enhancement layer encoder for part of each frame of an input video image. Thus, an image is notionally divided into 12 groups of blocks (GOBs) and over a sequence of frames the quantiser of the H. 261 encoder be set to the fixed step size of the enhancement coder quantiser for each of the GOBs in turn. This results in the coding in the base layer of more data than usual for the GOB selected in a particular frame, and no data will be encoded in the enhancement layer because the threshold level of the enhancement coder will become very high, while at the same time the energy of the variable difference data of the selected GOB will be low. With the quantiser in the H. 261 coder having a small step size the quantisation errors will be small and the errors will be less than their quantiser step size in the enhancement layer. The result will be a fall in the instantaneous coded data rate in the enhancement layer and an increase in the instantaneous coded data rate in the base layer, though of course because of the buffering in the base layer the constant bit rate of that layer is maintained. By means of this process of selectively forcing small step size quantisation of GOBs of a picture in turn, any changes in the picture with energy levels too low to be picked up in the enhancement layer coding will periodically be mopped up in the base layer coding.

The encoding process has been described in relation to the encoder of FIG. 2. The decoding process is essentially the reverse of the encoding process and therefore will only be described in general terms with reference to FIG. 3 which illustrates a decoder of the preferred embodiment. Thus, a received signal from the CBR channel is decoded by an H. 261 decoder circuit in a conventional way while the enhancement data on the VBR channel is processed by line interface (LI) and analysed by cell loss detector (CLD) to determine if any data cells have been lost in transmission. The received data is demultiplexed and variable length decoded (DMux & VLD) before being inverse (fixed-step size) quantised and DCT. The resulting decoded variable data is summed with the output of the H. 261 decoder to provide a digital video output signal. To take account of cell loss the demultiplexer of the enhancement layer is synchronised with the demultiplexer of the base, H. 261 layer.

The preferred embodiment has been described in relation to post DCT differencing to establish the variable difference data transmission. The differencing may occur prior to such coding in the PEL domain so that there the variable difference data would reflect both the quantisation and transformation errors.

As an alternative to the method of determining block energy described in the preferred embodiment, the block energy may be determined as the sum of the absolute differences, is the sum of the absolute values of the coefficients of the enhancement layer data.

We claim:

1. A method of coding a video signal for transmission, comprising the steps of:
    coding data representing the video signal by a base layer coding operation which includes a base layer quantization step size to provide coded video data for transmission;
    deriving inverse-coded video data by carrying out an inverse base layer coding operation on the coded video data;
    deriving difference data from the data representing the video signal and the inverse-coded video data; and
    coding the difference data by an enhancement layer coding operation;
    characterised in that the difference data is coded only when the energy of the difference data exceeds a variable threshold, the threshold being inversely proportional to the base layer quantization step size.

2. A method as claimed in claim 1 in which the enhancement layer coding operation includes quantization.

3. A method as claimed in claim 2 in which the base layer quantization step size is selectively set to be the same as an enhancement layer quantization step size for data representing a part of an image of the video signal.

4. A method as claimed in claim 3 in which the image is divided into a series of sections and for each image of the video signal data, one of the sections of the image is processed with the quantization step size of the base layer coding operation set to be the same as the enhancement layer quantization step size.

5. A method as claimed in claim 1 in which the data representing the video signal is itself a coded representation of the video signal.

6. A method as claimed in claim 5 in which the data representing the video signal is a discrete cosine-transform coding of a representation of the video signal.

7. An apparatus for encoding a video signal for transmission, comprising:
- means for coding data representing the video signal by a base layer coding operation which includes a base layer quantizer having a base layer quantization step size to provide coded video data for transmission;
- means for deriving inverse-coded video data by carrying out an inverse base layer coding operation on the coded video data;
- means for deriving difference data from the data representing the video signal and the inverse-coded video data; and
- means for coding the difference data by an enhancement layer coding operation;
- characterised in that the means for coding the difference data operates only when the energy of the difference data exceeds a variable threshold, the threshold being inversely proportional to the base layer quantization step size.

* * * * *